(12) United States Patent
Takeda et al.

(10) Patent No.: US 12,017,724 B2
(45) Date of Patent: Jun. 25, 2024

(54) ELECTRONIC DEVICE RELATED TO HUMAN-POWERED VEHICLE OPERATING DEVICE AND METHOD FOR CONTROLLING ELECTRONIC DEVICE RELATED TO HUMAN-POWERED VEHICLE OPERATING DEVICE

(71) Applicant: Shimano Inc., Osaka (JP)

(72) Inventors: Kazuhiro Takeda, Osaka (JP); Tsuyoshi Miyake, Osaka (JP); Shun Komobuchi, Osaka (JP); Daisuke Nago, Osaka (JP)

(73) Assignee: Shimano Inc., Osaka (JP)

( * ) Notice: Subject to any disclaimer, the term of this patent is extended or adjusted under 35 U.S.C. 154(b) by 973 days.

(21) Appl. No.: 16/999,515

(22) Filed: Aug. 21, 2020

(65) Prior Publication Data
US 2021/0061394 A1 Mar. 4, 2021

(30) Foreign Application Priority Data

Aug. 29, 2019 (JP) .................................. 2019-157320

(51) Int. Cl.
*B62J 45/20* (2020.01)
*B62J 45/10* (2020.01)
(Continued)

(52) U.S. Cl.
CPC ............... *B62J 45/20* (2020.02); *B62J 45/10* (2020.02); *B62L 3/00* (2013.01); *B62M 9/00* (2013.01)

(58) Field of Classification Search
CPC .. B62J 45/20; B62J 45/10; B62J 50/20; B62L 3/00; B62M 9/00; B62M 25/08; B62K 23/06
See application file for complete search history.

(56) References Cited

U.S. PATENT DOCUMENTS 4,512,567 A * 4/1985 Phillips ................. A63F 13/816
74/551.8
5,362,069 A * 11/1994 Hall-Tipping ..... A63B 24/0087
482/901
(Continued)

FOREIGN PATENT DOCUMENTS

DE 201 01 116 U1 4/2001
DE 20 2004 013 989 U1 12/2004
(Continued)

*Primary Examiner* — Rami Khatib
(74) *Attorney, Agent, or Firm* — Global IP Counselors, LLP (57) ABSTRACT

An electronic device is related to a human-powered vehicle operating device that includes an operating mechanism, which is for operating at least one of a human-powered vehicle transmission device and a human-powered vehicle braking device, and at least one operating member. The electronic device comprises a storage, an electronic controller, and a communication unit. The storage stores setting information related to an operation of the at least one operating member and to an output destination device. The electronic controller is configured to generate an output signal corresponding to the operation of the at least one operating member based on the setting information. The communication unit transmits the output signal to the output destination device that includes at least one of a game device, a training device, an audio device, and a video device.

19 Claims, 6 Drawing Sheets

(51) Int. Cl.
   *B62L 3/00*    (2006.01)
   *B62M 9/00*    (2006.01)

(56) References Cited

U.S. PATENT DOCUMENTS

| | | | | |
|---|---|---|---|---|
| 5,839,990 | A * | 11/1998 | Virkkala | A63F 13/211 |
| | | | | 482/7 |
| 5,888,172 | A * | 3/1999 | Andrus | A63F 13/245 |
| | | | | 482/3 |
| 6,004,243 | A * | 12/1999 | Ewert | A63F 13/245 |
| 6,142,913 | A * | 11/2000 | Ewert | G11B 31/00 |
| 6,244,988 | B1 * | 6/2001 | Delman | A63B 71/0622 |
| | | | | 482/901 |
| 6,450,922 | B1 * | 9/2002 | Henderson | G16H 40/63 |
| | | | | 482/901 |
| 2004/0176895 | A1 * | 9/2004 | Takeda | B62M 25/08 |
| | | | | 701/55 |
| 2007/0123390 | A1 * | 5/2007 | Mathis | A63F 13/816 |
| | | | | 482/8 |
| 2007/0197274 | A1 * | 8/2007 | Dugan | A63F 13/65 |
| | | | | 463/7 |
| 2014/0173082 | A1 * | 6/2014 | Shin | G06F 8/65 |
| | | | | 709/223 |
| 2015/0054760 | A1 * | 2/2015 | Amaru | G02B 27/01 |
| | | | | 345/173 |
| 2016/0156385 | A1 * | 6/2016 | Kiyokawa | B62M 23/00 |
| | | | | 375/257 |
| 2017/0361894 | A1 | 12/2017 | Gahlert | |
| 2018/0141611 | A1 | 5/2018 | Komada | |

FOREIGN PATENT DOCUMENTS

| | | |
|---|---|---|
| DE | 697 29 202 T2 | 5/2005 |
| DE | 20 2007 005 673 U1 | 9/2007 |
| DE | 20 2007 005 673 U1 | 10/2007 |
| DE | 10 2017 107 383 A1 | 10/2017 |
| JP | 11-171069 A | 6/1999 |
| JP | 2005-21391 A | 1/2005 |
| JP | 2008-94291 A | 4/2008 |
| JP | 2015-131533 A | 7/2015 |
| JP | 2016-101865 A | 6/2016 |
| JP | 2018-89989 A | 6/2018 |

* cited by examiner

ELECTRONIC DEVICE RELATED TO HUMAN-POWERED VEHICLE OPERATING DEVICE AND METHOD FOR CONTROLLING ELECTRONIC DEVICE RELATED TO HUMAN-POWERED VEHICLE OPERATING DEVICE

CROSS-REFERENCE TO RELATED APPLICATIONS

This application claims priority to Japanese Patent Application No. 2019-157320, filed on Aug. 29, 2019. The entire disclosure of Japanese Patent Application No. 2019-157320 is hereby incorporated herein by reference.

BACKGROUND

Technical Field

The present invention generally relates to an electronic device related to a human-powered vehicle operating device and a method for controlling an electronic device related to a human-powered vehicle operating device.

Background Information

Japanese Laid-Open Patent Publication No. 2008-94291 (Patent Document 1) discloses an example of a human-powered vehicle operating device that operates a human-powered vehicle component.

SUMMARY

One object of the present disclosure is to provide an electronic device related to a human-powered vehicle operating device and a method for controlling an electronic device related to a human-powered vehicle operating device that improve usability.

An electronic device in accordance with a first aspect of the present disclosure is related to a human-powered vehicle operating device that includes an operating mechanism and at least one operating member. The operating mechanism is for operating at least one of a human-powered vehicle transmission device and a human-powered vehicle braking device. The electronic device comprises a storage, an electronic controller, and a communication unit. The storage stores setting information related to an operation of the at least one operating member and to an output destination device. The electronic controller is configured to generate an output signal corresponding to the operation of the at least one operating member based on the setting information. The communication unit transmits the output signal to the output destination device. The output destination device includes at least one of a game device, a training device, an audio device, and a video device.

The electronic device according to the first aspect transmits the output signal to the output destination device through operation of the at least one operating member of the operating device. This allows a user to operate the output destination device with the operating device and improves usability.

In accordance with a second aspect of the present disclosure, the electronic device according to the first aspect is configured so that the setting information includes game device setting information corresponding to the game device.

The electronic device according to the second aspect allows a user to operate the game device with the operating device.

In accordance with a third aspect of the present disclosure, the electronic device according to the second aspect is configured so that the game device setting information includes information associating the operation of the at least one operating member with at least one of activation of the game device, deactivation of the game device, changing traveling direction, changing traveling road, a cornering operation, obstacle avoidance, a transmission operation, changing rider posture, team chat initiation, team chat termination, a screen operation, changing display information, and changing travel environment.

The electronic device according to the third aspect allows a user to perform at least one of activation of the game device, deactivation of the game device, changing traveling direction, changing traveling road, a cornering operation, obstacle avoidance, a transmission operation, changing rider posture, team chat initiation, team chat termination, a screen operation, changing display information, and changing travel environment with the operating device.

In accordance with a fourth aspect of the present disclosure, the electronic device according to any one of the first to third aspects is configured so that the setting information includes training device setting information corresponding to the training device.

The electronic device according to the fourth aspect allows a user to operate the training device with the operating device.

In accordance with a fifth aspect of the present disclosure, the electronic device according to the fourth aspect is configured so that the training device setting information includes information associating the operation of the at least one operating member with at least one of activation of the training device, deactivation of the training device, and changing of load setting.

The electronic device according to the fifth aspect allows a user to perform at least one of activation of the training device, deactivation of the training device, and changing of a load setting with the operating device.

In accordance with a sixth aspect of the present disclosure, the electronic device according to any one of the first to fifth aspects is configured so that the setting information includes audio device setting information corresponding to the audio device.

The electronic device according to the sixth aspect allows a user to operate the audio device with the operating device.

In accordance with a seventh aspect of the present disclosure, the electronic device according to the sixth aspect is configured so that the audio device setting information includes information associating the operation of the at least one operating member with at least one of activation of the audio device, deactivation of the audio device, replaying music, stopping music, fast-forwarding music, rewinding music, changing volume, changing effect, and changing an equalizer.

The electronic device according to the seventh aspect allows a user to perform at least one of activation of the audio device, deactivation of the audio device, replaying music, stopping music, fast-forwarding, rewinding music, changing volume, changing effect, and changing an equalizer with the operating device.

In accordance with an eighth aspect of the present disclosure, the electronic device according to any one of the first to seventh aspects is configured so that the setting information includes video device setting information corresponding to the video device.

The electronic device according to the eighth aspect allows a user to operate the video device with the operating device.

In accordance with a ninth aspect of the present disclosure, the electronic device according to the eighth aspect is configured so that the video device setting information includes information associating the operation of the at least one operating member with at least one of activation of the video device, deactivation of the video device, replaying a video, stopping a video, fast-forwarding a video, rewinding a video, and changing a video channel.

The electronic device according to the ninth aspect allows a user to perform at least one of activation of the video device, deactivation of the video device, replaying of a video, stopping a video, fast-forward a video, rewinding a video, and changing a video channel with the operating device.

In accordance with a tenth aspect of the present disclosure, the electronic device according to any one of the first to ninth aspects is configured so that the communication unit is configured to receive changing information for changing the setting information. Further, the electronic controller is configured to update the setting information based on the changing information received by the communication unit.

The electronic device according to the tenth aspect allows the setting information to be updated in a manner preferable for the output destination device or a user.

In accordance with an eleventh aspect of the present disclosure, the electronic device according to the tenth aspect is configured so that the communication unit is configured to receive the changing information through at least one of wired communication and wireless communication.

The electronic device according to the eleventh aspect receives the changing information through at least one of wired communication and wireless communication in a preferred manner.

In accordance with a twelfth aspect of the present disclosure, the electronic device according to any one of the first to eleventh aspects is configured so that the at least one operating member includes a plurality of operating members. Further, the setting information includes information corresponding to operation of each of the operating members.

The electronic device according to the twelfth aspect allows a user to operate the output destination device in accordance with the operation of each of the operating members.

In accordance with a thirteenth aspect of the present disclosure, the electronic device according to any one of the first to twelfth aspects is configured so that the operation of the at least one operating member includes a plurality of operating procedures. Further, the setting information includes information corresponding to each operating procedure of the at least one operating member.

The electronic device according to the thirteenth aspect allows a user to operate the output destination device in accordance with each of the operating procedures.

In accordance with a fourteenth aspect of the present disclosure, the electronic device according to any one of the first to thirteenth aspects is configured so that the electronic controller is configured to be switched between a first mode and a second mode. The first mode generates the output signal corresponding to the operation of the at least one operating member and the output destination device based on the setting information in accordance with the operation of the at least one operating member. The second mode does not generate the output signal corresponding to the operation of the at least one operating member and the output destination device based on the setting information in accordance with the operation of the at least one operating member.

In the electronic device according to the fourteenth aspect, the electronic controller is switchable between the first mode in which the electronic controller operates the output destination device and the second mode in which the electronic controller does not operate the output destination device.

In accordance with a fifteenth aspect of the present disclosure, the electronic device according to any one of the first to fourteenth aspects is configured so that the communication unit is configured to transmit the output signal to the output destination device through at least one of wired communication and wireless communication.

The electronic device according to the fifteenth aspect transmits the output signal to the output destination device through at least one of wired communication and wireless communication in a preferred manner.

In accordance with a sixteenth aspect of the present disclosure, the electronic device according to any one of the first to fifteenth aspects further comprises a housing that houses the storage, the electronic controller, and the communication unit. The housing is located at a position separated from the human-powered vehicle operating device.

The electronic device according to the sixteenth aspect allows the communication unit to be disposed at a preferred position on the human-powered vehicle.

In accordance with a seventeenth aspect of the present disclosure, the electronic device according to the sixteenth aspect is configured to perform wired or wireless communication with the human-powered vehicle operating device.

With the electronic device according to the seventeenth aspect, the electronic device including the housing, which is disposed at a position separated from the operating device, performs wired or wireless communication with the operating device in a preferred manner.

In accordance with an eighteenth aspect of the present disclosure, the electronic device according to any one of the first to fifteenth aspects is configured so that the storage, the electronic controller, and the communication unit are provided on a housing of the human-powered vehicle operating device.

The electronic device according to the eighteenth aspect is provided on the housing of the operating device. This allows a user to easily handle the electronic device.

A control method in accordance with a nineteenth aspect of the present disclosure is a method for controlling an electronic device related to a human-powered vehicle operating device that includes an operating mechanism and at least one operating member. The operating mechanism is for operating at least one of a human-powered vehicle transmission device and a human-powered vehicle braking device. The method comprises generating an output signal corresponding to an operation of the at least one operating member based on setting information related to the operation of the at least one operating member and to an output destination device. Further, the method comprises transmitting the output signal to the output destination device. The output destination device includes at least one of a game device, a training device, an audio device, and a video device.

The controlling method in accordance with the nineteenth aspect allows for transmission of the output signal to the output destination device through operation of the at least one operating member of the operating device. This allows a user to operate the output destination device with the operating device and improves usability.

The electronic device related to the human-powered vehicle operating device and the method for controlling the electronic device related to the human-powered vehicle operating device in accordance with the present disclosure improve usability.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiment

With reference to FIGS. 1 to 7, an electronic device 70 related to a human-powered vehicle operating device 50 and a method for controlling the electronic device 70 related to the human-powered vehicle operating device 50 will now be described. A human-powered vehicle 10 is a vehicle that can be driven by at least human driving force. There is no limit to the number of wheels of the human-powered vehicle 10. For example, the human-powered vehicle 10 can be a unicycle or a vehicle having three or more wheels. Examples of the human-powered vehicle 10 include various types of bicycles such as a mountain bike, a road bike, a city bike, a cargo bike, and a recumbent bicycle, as well as an electric bicycle (E-bike). The electric bicycle includes an electric assist bicycle that assists in propulsion of the vehicle with an electric motor. In the embodiment described hereafter, the human-powered vehicle 10 will be referred to as a bicycle.

Figure 1:
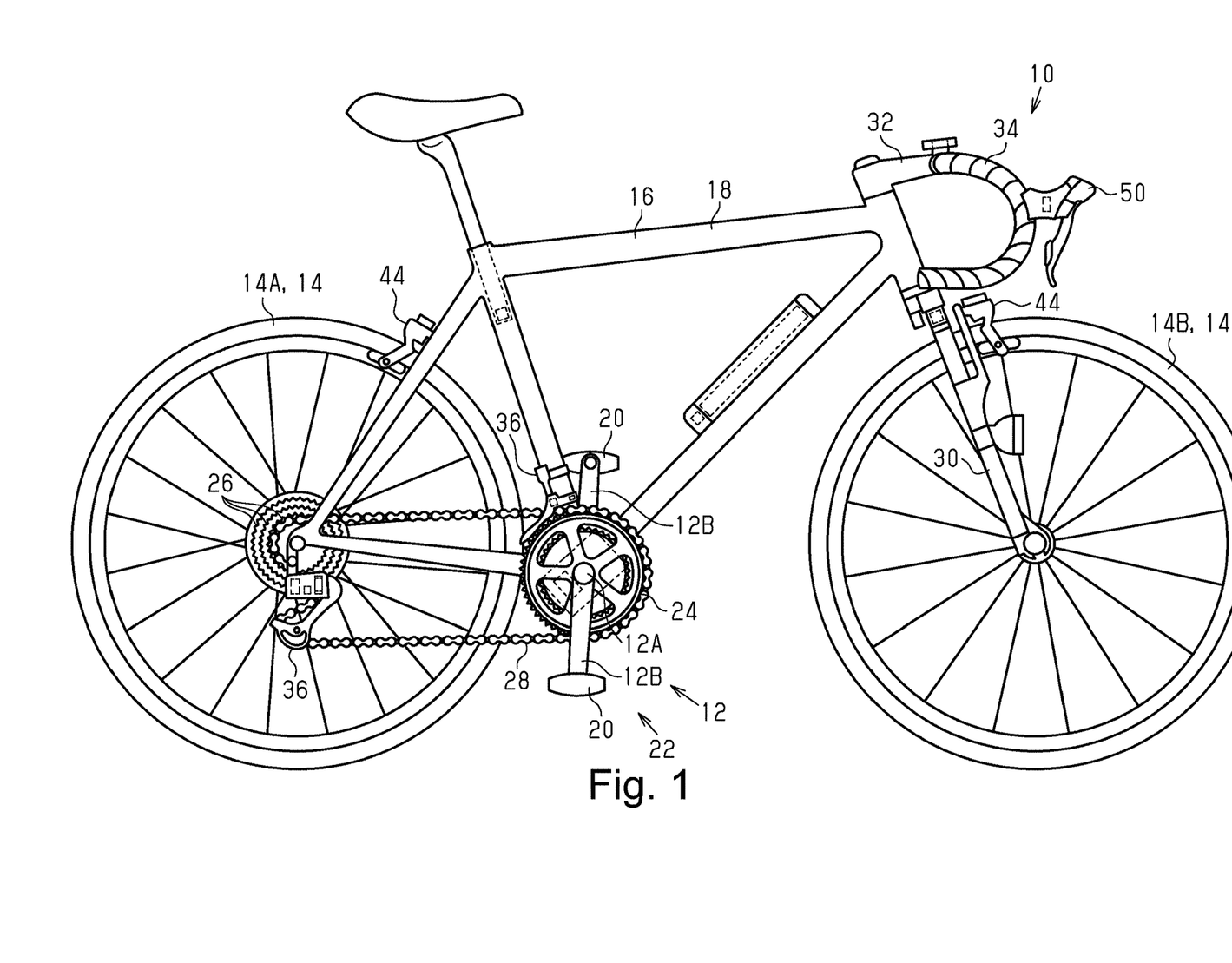
FIG. 1 is a side elevational view of a human-powered vehicle including an electronic device related to a human-powered vehicle operating device in accordance with one embodiment

The human-powered vehicle 10 includes a crank 12 to which human driving force is input. The human-powered vehicle 10 further includes a wheel 14 and a vehicle body 16. Here, in the illustrated embodiment, the human-powered vehicle 10 includes a rear wheel 14A and a front wheel 14B. The vehicle body 16 includes a frame 18. The crank 12 includes a crank axle 12A and two crank arms 12B. The crank axle 12A is rotatably supported by the frame 18. The two crank arms 12B are provided on two ends of the crank axle 12A, respectively. Two pedals 20 are connected to the two crank arms 12B, respectively. The rear wheel 14A is driven by the rotation of the crank 12. The rear wheel 14A is supported by the frame 18. The crank 12 is connected to the rear wheel 14A by a drive mechanism 22. The drive mechanism 22 includes a first rotational body 24 connected to the crank axle 12A. The crank axle 12A can be connected to the first rotational body 24 by a first one-way clutch. The first one-way clutch is configured to rotate the first rotational body 24 forward in a case where the crank 12 is rotated forward and configured not to rotate the first rotational body 24 rearward in a case where the crank 12 is rotated rearward. The first rotational body 24 includes a sprocket, a pulley, or a bevel gear. The drive mechanism 22 further includes a second rotational body 26 and a linking member 28. The linking member 28 transmits the rotational force of the first rotational body 24 to the second rotational body 26. The linking member 28 includes, for example, a chain, a belt, or a shaft.

The second rotational body 26 is connected to the rear wheel 14A. The second rotational body 26 includes a sprocket, a pulley, or a bevel gear. Preferably, a second one-way clutch is provided between the second rotational body 26 and the rear wheel 14A. The second one-way clutch is configured to rotate the rear wheel 14A in a case where the second rotational body 26 is rotated forward and configured not to rotate the rear wheel 14A rearward in a case where the second rotational body 26 is rotated rearward.

The front wheel 14B is attached to the frame 18 by a front fork 30. A handlebar 34 is connected to the front fork 30 by a stem 32. In the present embodiment, the rear wheel 14A is connected to the crank 12 by the drive mechanism 22. Alternatively, at least one of the rear wheel 14A and the front wheel 14B can be connected to the crank 12 by the drive mechanism 22.

Preferably, the human-powered vehicle 10 further includes a transmission device 36. The transmission device 36 is configured to change a transmission ratio of the human-powered vehicle 10. The transmission device 36 includes, for example, at least one of a front derailleur, a rear derailleur, and an internal transmission device. In a case where the transmission device 36 includes an internal transmission device, the internal transmission device is provided, for example, on a hub of the rear wheel 14A.

Figure 3:
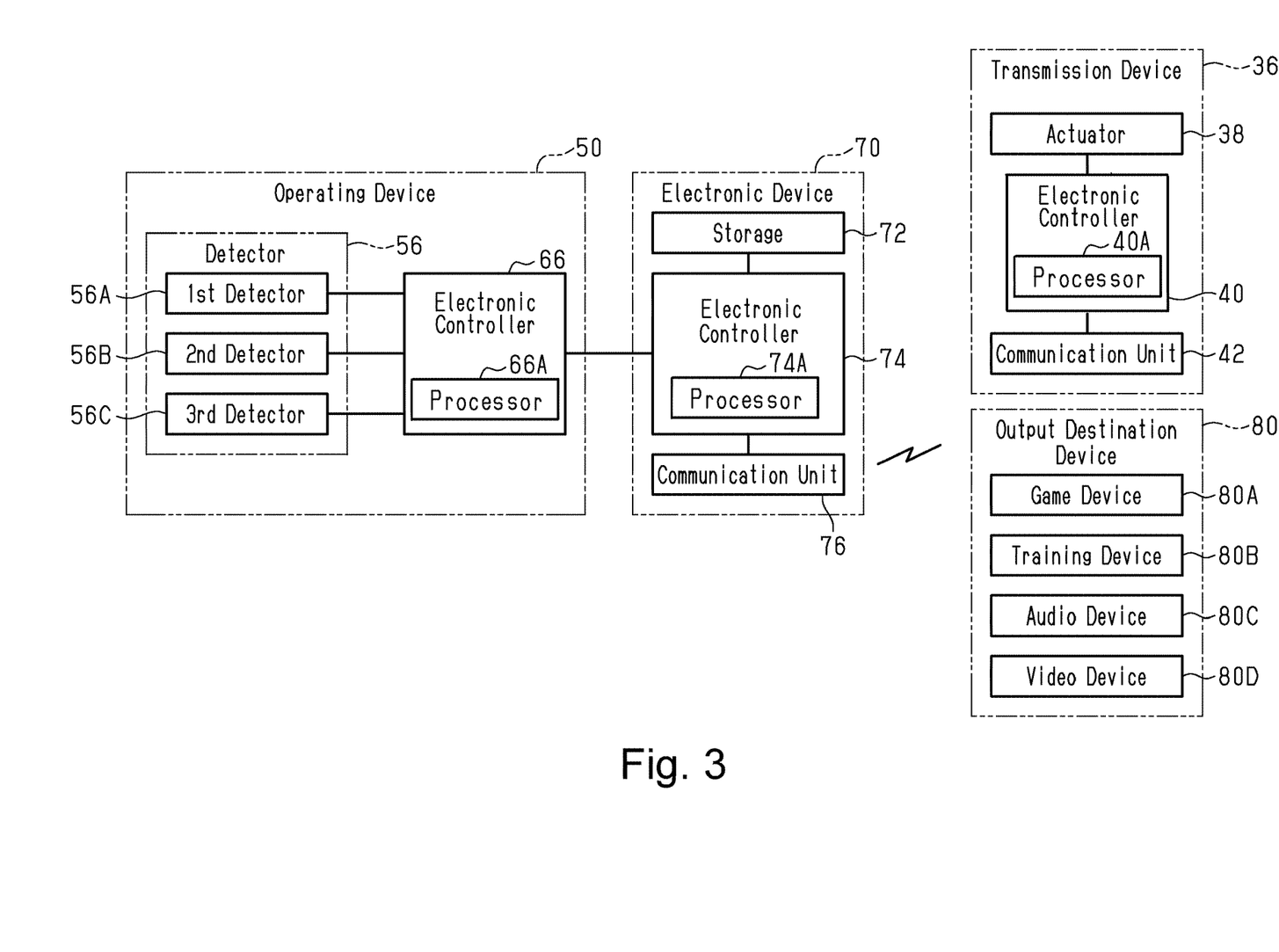
FIG. 3 is a block diagram showing the electrical configuration of the electronic device related to the human-powered vehicle operating device in accordance with the embodiment.

The transmission device 36 includes an actuator 38, an electronic controller 40, and a communication unit 42. The term "electronic controller" as used herein refers to hardware that executes a software program, and does not include a human. The electronic controller 40 includes at least one processor 40A that executes predetermined control programs. The processor 40A includes, for example, a central processing unit (CPU) or a micro-processing unit (MPU). When the electronic controller 40 has more than one processors, the processors can be located at the same location (e.g., a single printed circuit board) or at one or more separate locations. The actuator 38 includes, for example, an electric motor. The electronic controller 40 can include one or more microcomputers. The communication unit 42 is configured to communicate with a communication unit 76 of the electronic device 70. Preferably, the communication unit 42 is configured to perform wireless communication. The wireless communication unit 42 communicates with a communication peer device through, for example, at least one of Bluetooth®, ANT+®, Wi-Fi®, and infrared communication. The communication peer device includes the communication unit 76 of the electronic device 70. The term "communication unit" as used herein can also be referred to as a communication interface or a communication device. The communication unit, interface or device is a hardware device capable of transmitting an analog or digital signal over a communication wire, or wirelessly. The electronic controller 40 operates the actuator 38 by controlling the electric power supplied to the actuator 38. The electronic controller 40 changes the transmission ratio by operating the actuator 38 in accordance with information received by the communication unit 42.

Preferably, the human-powered vehicle 10 further includes a braking device 44. The braking device 44 performs braking of the wheel 14 of the human-powered vehicle 10. The braking device 44 includes at least of a rear brake that performs braking of the rear wheel 14A and a front brake that performs braking of the front wheel 14B. The braking device 44 can be operated mechanically or hydraulically.

Figure 2:
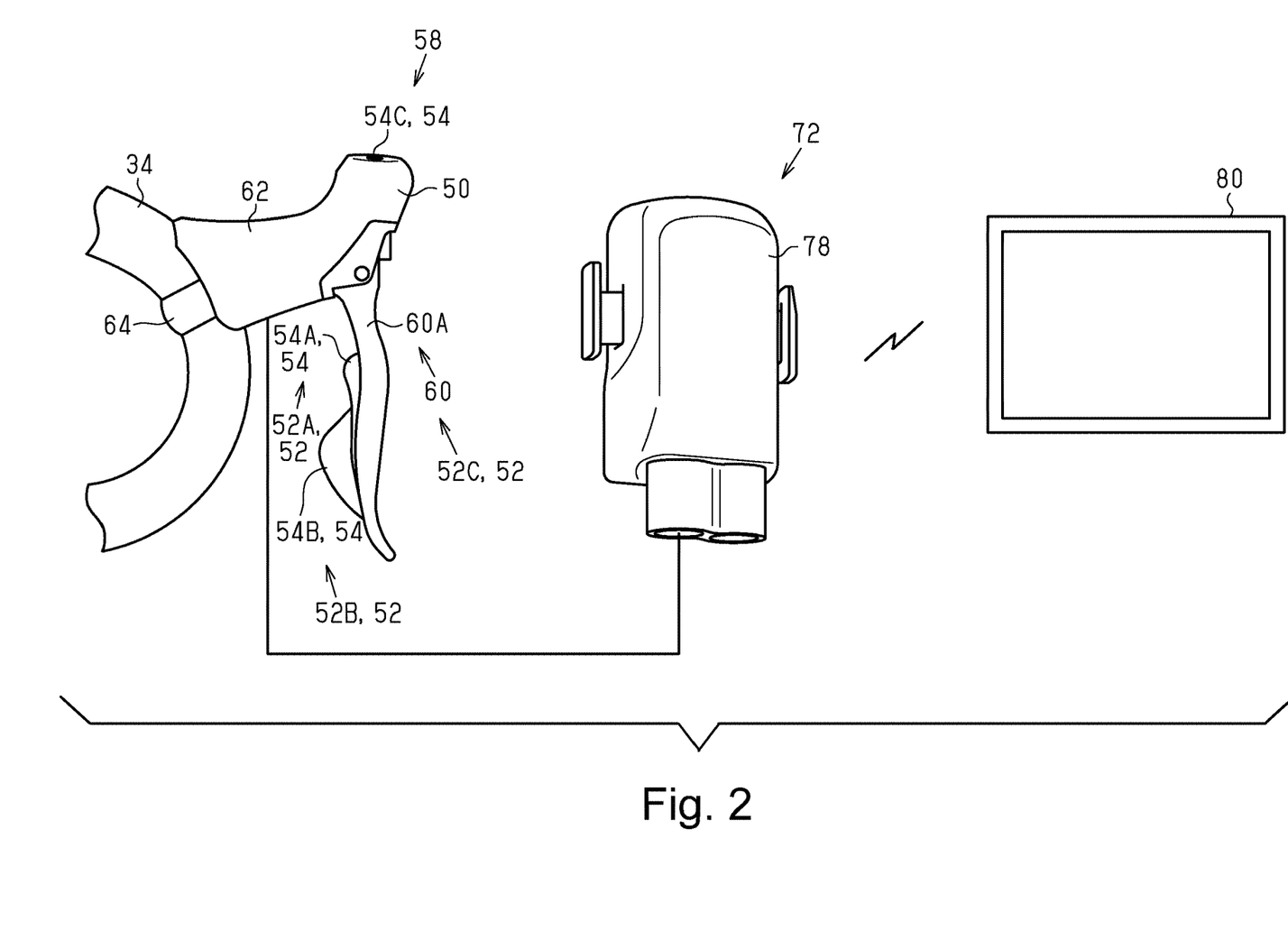
FIG. 2 is a schematic diagram of the operating device and the electronic device in accordance with the embodiment.

The electronic device 70 is related to the human-powered vehicle operating device 50. The human-powered vehicle operating device 50 includes an operating mechanism 52 and at least one operating member 54. The operating mechanism 52 is for operating at least one of the human-powered vehicle transmission device 36 and the human-powered vehicle braking device 44. Preferably, the operating device 50 includes at least one detector 56. Each operating member 54 is configured to be operated by a user. Each operating member 54 is, for example, a lever, a button, or a switch. Each operating member 54 can include a touch panel.

Each detector 56 is configured to detect an operation of one operating member 54 of the at least one operating member 54. Each detector 56 transmits a detection signal to an electronic controller 74 of the electronic device 70 in accordance with the operation of the corresponding operating member 54. Each detector 56 includes, for example, an electric switch or a position sensor. The electric switch is configured to be switched on and off in accordance with the operation of the corresponding operating member 54. The position sensor is configured to detect the position of the corresponding operating member 54. In a case where the operating member 54 includes a touch panel, the detector 56 includes the same touch panel as the corresponding operating member 54.

The at least one operating member 54 includes, for example, a first operating member 54A, a second operating member 54B, and a third operating member 54C. The at least one detector 56 includes, for example, a first detector 56A, a second detector 56B, and a third detector 56C. The first detector 56A outputs a signal corresponding to the operation of the first operating member 54A. The second detector 56B outputs a signal corresponding to the operation of the second operating member 54B. The third detector 56C outputs a signal corresponding to the operation of the third operating member 54C.

Preferably, the operating device 50 includes a plurality of operating mechanisms 52. Preferably, each operating mechanism 52 includes one operating member 54. One operating mechanism 52 includes, for example, one operating member 54 and one detector 56. For example, in the operating device 50 shown in FIG. 2, the first operating member 54A and the first detector 56A form a first operating mechanism 52A, which is for operating the transmission device 36. For example, in the operating device 50 shown in FIG. 2, the second operating member 54B and the second detector 56B form a second operating mechanism 52B, which is for operating the transmission device 36. For example, one of the first operating mechanism 52A and the second operating mechanism 52B is the operating mechanism 52 for shifting up the transmission device 36, and the other one of the first operating mechanism 52A and the second operating mechanism 52B is the operating mechanism 52 for shifting down the transmission device 36. In a case where the human-powered vehicle 10 includes a plurality of transmission devices 36, the first operating mechanism 52A and the second operating mechanism 52B can be configured to correspond to control of the different transmission devices 36.

The operating device 50 can include an additional operating mechanism 58 that operates a human-powered vehicle component other than the transmission device 36 or the braking device 44. For example, in the operating device 50 shown in FIG. 2, the third operating member 54C and the third detector 56C form the additional operating mechanism 58. An operation subject component of the additional operating mechanism 58 includes, for example, at least one of a lamp, a cycle computer, suspension, an adjustable seatpost, and a drive unit. The third operating member 54C and the third detector 56C can form the operating mechanism 52 for operating at least one of the transmission device 36 and the braking device 44.

The operating device 50 can further include a braking operation mechanism 60. For example, the braking operation mechanism 60 includes a braking operation member 60A, a connecting member that connects the braking operation member 60A and a human-powered vehicle component. In a case where the braking device 44 is of a cable type, the connecting member is a Bowden cable. In a case where the braking device 44 is of a hydraulic type, the connecting member is a hydraulic tube. For example, the braking operation member 60A of the operating device 50 shown in FIG. 2 is configured to operate the braking device 44. The connecting member that connects the braking operation member 60A shown in FIG. 2 and the braking device 44 is part of the operating mechanism 52C, which is for operating the braking device 44. In the operating device 50 shown in FIG. 2, the operating mechanism 52C for operating the braking device 44 is configured by the braking operation mechanism 60.

The at least one operating member 54 can be part of the operating mechanism 52 but does not have to be part of the operating mechanism 52. In the operating device 50 shown in FIG. 2, the first operating member 54A and the second operating member 54B are part of the operating mechanism 52, and the third operating member 54C is not part of the operating mechanism 52. In a case where none of the at least one operating member 54 is part of the operating mechanism 52, the operating mechanism 52 can be connected to each operation subject component and operated manually.

The operating device 50 further includes a housing 62 and a mount 64. The at least one operating member 54, the at least one detector 56, and the braking operation member 60A are provided on the housing 62. The mount 64 is configured to couple the housing 62 to the human-powered vehicle 10. The mount 64 includes, for example, a clamp. The mount 64 is, for example, configured to be coupled to the handlebar 34 of the human-powered vehicle 10. In the illustrated embodiment, the operating device 50 is a brifter (i.e., a shifter and a brake operating device) that is mounted to the handlebar 34. Thus, in the illustrated embodiment, the housing 62 is often referred to as a base or bracket, while the mount 64 is often referred to as a handlebar clamp.

The operating device 50 further includes an electronic controller 66. The electronic controller 66 includes at least one processor 66A that executes predetermined control programs. The processor 66A includes, for example, a central processing unit (CPU) or a micro-processing unit (MPU). When the electronic controller 66 has more than one processors, the processors can be located at the same location (e.g., a single printed circuit board) or at one or more separate locations. The electronic controller 66 can include one or more microcomputers.

Figure 4:
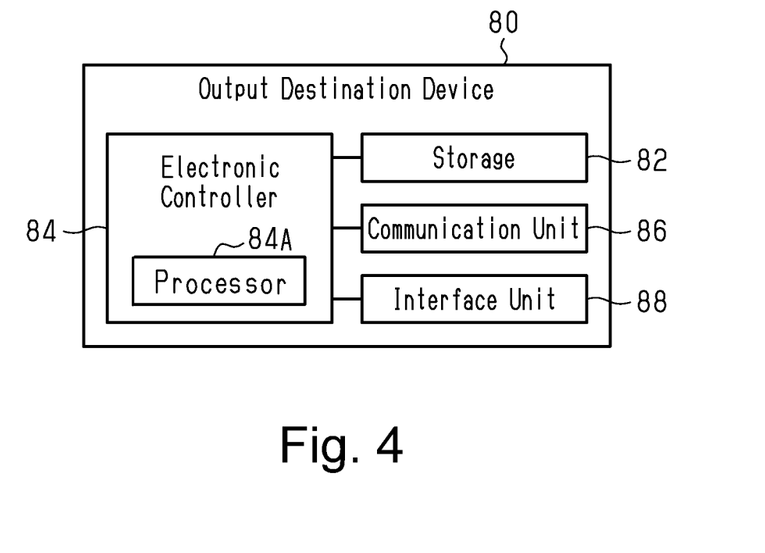
FIG. 4 is a block diagram showing the electrical configuration of an output destination device to which the electronic device shown in FIG. 3 transmits an output signal.

The electronic device 70 includes storage 72, an electronic controller 74 and the communication unit 76. The storage 72 stores setting information related to the operation of the at least one operating member 54 and to an output destination device 80. The electronic controller 74 is configured to generate an output signal corresponding to the operation of the at least one operating member 54 based on the setting information. The communication unit 76 transmits the output signal to the output destination device 80. The output destination device 80 includes at least one of a game device 80A, a training device 80B, an audio device 80C, and a video device 80D.

Preferably, the output destination device 80 can be used by a user in a state in which the operating device 50 is mounted on the human-powered vehicle 10 and the user is riding the human-powered vehicle 10.

Preferably, the game device 80A executes a game that is related to the human-powered vehicle 10. The game device 80A can be configured to execute a game that is not related to the human-powered vehicle 10. Preferably, the training device 80B is for performing training related to the human-powered vehicle 10. The training device 80B can be a device configured to connect with the human-powered vehicle 10. One example of the training device 80B is a cycle trainer. The game device 80A can include a cycle trainer.

The storage 72 stores information used for various types of control programs and control processes. The storage 72 can be any a non-transitory computer readable medium. The storage 72 includes, for example, a nonvolatile memory and a volatile memory. A non-volatile memory includes, for example, at least one of a read-only memory (ROM), an erasable programmable read-only memory (EPROM), an electrically erasable programmable read-only memory (EEPROM), and a flash memory. A volatile memory includes, for example, a random access memory (RAM).

The electronic controller 74 includes at least one processor 74A that executes predetermined control programs. The processor 74A includes, for example, a CPU or MPU. When the electronic controller 74 has more than one processors, the processors can be located at the same location (e.g., a single printed circuit board) or at one or more separate locations. The electronic controller 74 can include one or more microcomputers.

The communication unit 76 is configured to transmit an output signal to the output destination device 80 through at least one of wired communication and wireless communication. Preferably, the communication unit 76 includes a wireless communication unit. The wireless communication unit communicates with a communication peer device, for example, through Bluetooth®, ANT+®, Wi-Fi®, and infrared communication. Preferably, the communication peer device includes an operation subject device of the operating device 50. The electronic device 70 related to the operating device 50 shown in FIG. 2 is configured to perform wireless communication with the transmission device 36 and the output destination device 80.

The electronic device 70 further includes a housing 78. The housing 78 accommodates the storage 72, the electronic controller 74, and the communication unit 76. The housing 78 is located at a position separated from the human-powered vehicle operating device 50. The housing 78 is, for example, configured to be coupled to the frame 18 of the human-powered vehicle 10.

The electronic device 70 is configured to perform wired or wireless communication with the human-powered vehicle operating device 50. Preferably, in a case where the electronic device 70 and the operating device 50 are configured to perform wired or wireless communication, the operating device 50 includes the electronic controller 66 that is connected to the electronic controller 74 of the electronic device 70. The electronic controller 66 receives a detection signal from each detector 56. The electronic controller 66 transmits information corresponding to the detection signal to the electronic controller 74 of the electronic device 70. The electronic controller 66 can convert the detection signal into a digital signal and transmit the digital signal to the electronic controller 74 of the electronic device 70. Preferably, the electronic controller 74 of the electronic device 70 is configured to perform wired communication with the electronic controller 66 of the operating device 50. The electronic controller 74 of the electronic device 70 and the electronic controller 66 of the operating device 50 can be configured to communicate through power line communication (PLC). The operating device 50 does not have to include the electronic controller 66. In this case, for example, each detector 56 is connected to the electronic controller 74 of the electronic device 70 via an electric communication wire so that a detection signal of each detector 56 is directly input to the electronic controller 74.

Preferably, the communication unit 76 is configured to perform wireless communication. The wireless communication unit 76 communicates with a communication peer device through, for example, at least one of Bluetooth®, ANT+®, Wi-Fi®, and infrared communication. The communication peer device includes an operation subject device of the operating device 50. The electronic device 70 related to the operating device 50 shown in FIG. 2 is configured to communicate with the transmission device 36 and the output destination device 80.

In the operating device 50, in a case where the operating member 54, of which the operation subject is the transmission device 36, is operated, a detection signal of the detector 56 corresponding to the operated operating member 54 is input to the electronic controller 74 of the electronic device 70 via the electronic controller 66 of the operating device 50. The electronic controller 74 of the electronic device 70 transmits an output signal for executing a control, which is associated in advance with the operation of the operating member 54, from the communication unit 76 to the communication unit 42 of the transmission device 36. The electronic controller 40 of the transmission device 36 operates the actuator 38 in accordance with the received output signal.

The output destination device 80 includes a storage 82, an electronic controller 84, and a communication unit 86. Preferably, the output destination device 80 further includes an interface unit 88.

The storage 82 stores information used for various types of control programs and control processes. The storage 82 can be any a non-transitory computer readable medium. The storage 82 includes, for example, a nonvolatile memory and a volatile memory. A non-volatile memory includes, for example, at least one of a ROM, an EPROM, an EEPROM, and a flash memory. A volatile memory includes, for example, a RAM.

The electronic controller 84 includes at least one processor 84A that executes predetermined control programs. The processor 84A includes, for example, a CPU or MPU. When the electronic controller 84 has more than one processors, the processors can be located at the same location (e.g., a single printed circuit board) or at one or more separate locations. The electronic controller 84 can include one or more microcomputers. The electronic controller 84 is configured to execute an application related to the electronic device 70 that is stored in the storage 82.

Preferably, the communication unit 86 is configured to perform wireless communication. The wireless communication unit communicates with a communication peer device through, for example, at least one of Bluetooth®, ANT+®, Wi-Fi®, and infrared communication. The communication peer device includes the communication unit 76 of the electronic device 70.

The interface unit 88 forms a user interface. The interface unit 88 includes, for example, at least one of a screen, a microphone, and a speaker. The interface unit 88 can include an operation portion. The interface unit 88 can include a touch panel display that has an operation portion. The interface unit 88 can include a virtual reality device. A virtual reality device includes, for example, at least one of virtual reality goggles and a virtual reality headset.

In the operating device 50, in a case where the operating member 54, of which the operation subject is the output destination device 80, is operated, a detection signal of the detector 56 corresponding to the operated operating member 54 is input to the electronic controller 74 of the electronic device 70 via the electronic controller 66 of the operating device 50. The electronic controller 74 of the electronic device 70 transmits an output signal for executing a control, which is associated in advance with the operation of the first operating member 54A, from the communication unit 76 to the communication unit 86 of the output destination device 80. The electronic controller 84 of the output destination device 80 executes the control corresponding to the output signal received by the communication unit 86.

Preferably, the setting information includes information associating one operating member 54 with information related to an output signal generated by the electronic controller 74. In a case where the at least one operating member 54 is operated, the electronic controller 74 generates an output signal associated with the operating member 54 that is operated using the setting information.

A method for controlling the electronic device 70 includes generating an output signal based on the setting information related to the operation of the at least one operating member 54 and to the output destination device 80 in accordance with the operation of the at least one operating member 54. The method further includes transmitting the output signal to the output destination device 80.

A process in which the electronic controller 74 of the electronic device 70 transmits an output signal to the output destination device 80 will now be described with reference to FIG. 5. In a case where electric power is supplied to the electronic controller 74, the electronic controller 74 starts the process from step S11 of the flowchart shown in FIG. 5. In a case where the process of the flowchart in FIG. 5 ends, the electronic controller 74 repeats the process from step S11 in predetermined cycles until the supply of electric power stops.

In step S11, the electronic controller 74 determines whether a detection signal has been received. In a case where a detection signal has not been received, the electronic controller 74 ends the process. In a case where a detection signal has been received, the electronic controller 74 proceeds to step S12.

In step S12, the electronic controller 74 generates an output signal based on the setting information and then proceeds to step S13. Specifically, the electronic controller 74 reads information corresponding to the detection signal, which is determined to have been received in step S11, from the setting information and generates the output signal including the read information.

In step S13, the electronic controller 74 transmits the output signal generated in step S12 from the communication unit 76 and then ends the process. The communication unit 86 of the output destination device 80 receives the output signal transmitted from the communication unit 76. Then, the output destination device 80 executes various types of controls.

Preferably, in a case where the at least one operating member 54 includes a plurality of operating members 54, the setting information includes information corresponding to the operation of each operating member 54. In a case where one of the operating members 54 is operated, the electronic controller 74 reads information related to the output signal associated with the operated operating member 54 included in the setting information and generates the output signal in accordance with the read information.

The operation of the at least one operating member 54 can include a plurality of operating procedures. In this case, the setting information includes information corresponding to each operating procedure of the at least one operating member 54. The operating procedures include, for example, at least two of an operation that operates the operating member 54 once within a predetermined time, an operation that operates the operating member 54 twice within a predetermined time, an operation that operates the operating member 54 thrice within a predetermined time, an operation that continuously operates the operating member 54 for less than a predetermined time, and an operation that continuously operates the operating member 54 for a predetermined time or longer. In a case where one of the operating members 54 is operated, the electronic controller 74 reads information related to the output signal associated with the operating procedure of the operated operating member 54 included in the setting information and generates the output signal in accordance with the read information.

The at least one operating member 54 can include a plurality of operating members 54 and the operation of the at least one operating member 54 can include a plurality of operating procedures. In this case, preferably, the setting information includes information corresponding to operation of each of the operating members 54 and each operating procedure. In a case where one of the operating members 54 is operated, the electronic controller 74 reads information related to the output signal associated with the operated operating member 54 and the operating procedure of the operating member 54 included in the setting information and generates the output signal in accordance with the read information.

In a first example of the control method of the output destination device 80, the setting information includes identification information of the output destination device 80. An output signal includes the identification information of the output destination device 80 and operation information related to the operation of the at least one operating member 54. The operation information includes information that is associated in advance with at least one of the operated operating member 54 and the operating procedure of the operating member 54 included in the setting information. In a case where the electronic controller 74 of the output destination device 80 receives the output signal including self-identification information, the electronic controller 74 executes a control corresponding to the operation information. In a case where an application related to the electronic device 70 is executed or in a case where an application related to the electronic device 70 is executed in a state in which an output signal from the electronic device 70 is available, the output destination device 80 can be configured to execute the control corresponding to the received output signal. In a case where the at least one operating member 54 is only one operating member 54 and the setting information does not include the operation information, the operation information can include only information indicating that the at least one operating member 54 has been operated.

In the first example of the control method of the output destination device 80, the electronic controller 84 of the output destination device 80 can be configured to execute different controls in accordance with a control state of the electronic controller 84 even in a case where the same operation information is received.

In a second example of the control method of the output destination device 80, the setting information includes control information of the output destination device 80. In a case where the electronic controller 74 of the output destination device 80 receives an output signal, the electronic controller 74 executes a control corresponding to the control information. In a case where an application related to the electronic device 70 is executed or in a case where an application related to the electronic device 70 is executed in a state in which an output signal from the electronic device 70 is available, the output destination device 80 can be configured to execute the control corresponding to the received output signal. The setting information can further include the identification information of the output destination device 80. In this case, in a case where the electronic controller 74 of the output destination device 80 receives the output signal including self-identification information, the electronic controller 74 can be configured to execute a control corresponding to the control information.

In the second example of the control method of the output destination device 80, in a case where the same control information is included in the received output signal, the electronic controller 84 of the output destination device 80 can be configured to execute the same control. Preferably, in the second example of the control method of the output destination device 80, the electronic controller 84 of the output destination device 80 is configured to be switchable between a control state in which the control is executed in accordance with an output signal and a control state in which the control is not executed in accordance with an output signal.

In a case where the output destination device 80 includes the game device 80A, the setting information includes game device setting information corresponding to the game device 80A. Preferably, in a case where the output destination device 80 includes the game device 80A, the interface unit 88 includes a screen.

In a case where the output destination device 80 includes the game device 80A, in the first example of the control method of the output destination device 80, the game device setting information includes identification information of the game device 80A. In this case, in a case where the at least one operating member 54 is operated, the electronic controller 74 generates an output signal including the identification information of the game device 80A, which is included in the game device setting information, and the operation information related to the operated operating member 54. The communication unit 76 transmits the generated output signal to the game device 80A. The electronic controller 84 of the game device 80A executes the control corresponding to the output signal received by the communication unit 86. For example, in a state in which information that can be selected by a user is shown on the screen of the interface unit 88, in a case where the at least one operating member 54 is operated, the electronic controller 84 changes the selected information. For example, in a case where the first operating member 54A is operated, the electronic controller 84 changes a displayed content on the screen of the interface unit 88 so that the next option is selected. Further, in a case where the second operating member 54B is operated, the electronic controller 84 changes a displayed content on the screen of the interface unit 88 so that the previous option is selected.

In a case where the output destination device 80 includes the game device 80A, in the second example of the control method of the output destination device 80, the game device setting information includes information associating the operation of the at least one operating member 54 with at least one of activation of the game device 80A, deactivation of the game device 80A, changing traveling direction, changing traveling road, a cornering operation, obstacle avoidance, a transmission operation, changing rider posture, team chat initiation, team chat termination, a screen operation, changing display information, and changing travel environment. In a case where the at least one operating member 54 is operated, the electronic controller 74 generates an output signal including the game device setting information associated with the operation of the at least one operating member 54. The communication unit 76 transmits the generated output signal to the output destination device 80. The electronic controller 84 of the game device 80A executes the control corresponding to the output signal received by the communication unit 86.

For example, in a case where the game device setting information included in the received output signal includes activation of the game device 80A, the electronic controller 84 activates the game device 80A. For example, in a case where the game device setting information included in the received output signal includes deactivation of the game device 80A, the electronic controller 84 deactivates the game device 80A. For example, in a case where the game device setting information included in the received output signal includes changing traveling direction, the electronic controller 84 changes the traveling direction of the human-powered vehicle 10 in the game that is being played. For example, in a case where the game device setting information included in the received output signal includes changing traveling road, the electronic controller 84 changes the traveling road of the human-powered vehicle 10 in the game that is being played. For example, in a case where the game device setting information included in the received output signal includes a cornering operation, the electronic controller 84 performs a cornering operation of the human-powered vehicle 10 in the game that is being played. For example, in a case where the game device setting information included in the received output signal includes obstacle avoidance, the electronic controller 84 performs obstacle avoidance of the human-powered vehicle 10 in the game that is being played. For example, in a case where the game device setting information included in the received output signal includes a transmission operation, the electronic controller 84 performs a transmission operation of the human-powered vehicle 10 in the game that is being played. For example, in a case where the game device setting information included in the received output signal includes changing rider posture, the electronic controller 84 changes the rider posture of the human-powered vehicle 10 in the game that is being played. For example, in a case where the game device setting information included in the received output signal includes team chat initiation, the electronic controller 84 initiates a team chat in the game that is being played. For example, in a case where the game device setting information included in the received output signal includes team chat termination, the electronic controller 84 terminates a team chat in the game that is being played. For example, in a case where the game device setting information included in the received output signal includes a screen operation, the electronic controller 84 changes a displayed content on the screen of the interface unit 88. For example, the changing of a displayed content on the screen means changing a point of view of a traveling screen and the like. For example, in a case where the game device setting information included in the received output signal includes changing display information, the electronic controller 84 changes display information shown on the screen of the interface unit 88. The display information includes, for example, a level of a battery mounted on the human-powered vehicle 10. For example, in a case where the game device setting information included in the received output signal includes changing travel environment, the electronic controller 84 changes the travel environment of the human-powered vehicle 10 in a game. The travel environment includes, for example, the weather, air temperature, road condition, time of day, and the like in a game.

The electronic controller 74 of the electronic device 70 can be configured to transmit information related to the human-powered vehicle 10 to the game device 80A. The information related to the human-powered vehicle 10 includes, for example, at least one of a level of the battery of the human-powered vehicle 10, information related to a transmission ratio, information related to a vehicle speed, information related to a rotational speed of the crank 12, and information related to the human driving force input to the crank 12. The game device 80A can be configured to be capable of displaying the received information related to the human-powered vehicle 10.

The game device 80A can be configured to control at least one of selection of a travel route and an area, initiation of acquisition of various types of logs while a game is being played, termination of acquisition of various types of logs while a game is being played, initiation of recording transmission ratio information while a game is being played, and termination of recording a transmission ratio information while a game is being played in accordance with the operation of the at least one operating member 54.

In a case where the output destination device 80 includes the training device 80B, the setting information includes training device setting information corresponding to the training device 80B. Preferably, in a case where the output destination device 80 includes the training device 80B, the interface unit 88 includes at least one of a screen and an operation portion.

In a case where the output destination device 80 includes the training device 80B, in the first example of the control method of the output destination device 80, the training device setting information includes identification information of the training device 80B. In this case, in a case where the at least one operating member 54 is operated, the electronic controller 74 generates an output signal including the identification information of the training device 80B, which is included in the training device setting information, and the operation information related to the operated operating member 54. The communication unit 76 transmits the generated output signal to the training device 80B. The electronic controller 84 of the training device 80B executes the control corresponding to the output signal received by the communication unit 86. For example, in a case where the training device 80B includes a load application unit configured to change a training load, if the at least one operating member 54 is operated in a state in which the training load of the human-powered vehicle 10 can be changed, the electronic controller 84 changes the training load. For example, in a case where the first operating member 54A is operated, the electronic controller 84 controls the load application unit to decrease the training load. Further, in a case where the second operating member 54B is operated, the electronic controller 84 controls the load application unit to increase the training load. Preferably, the interface unit 88 of the training device 80B includes an operation portion for operating the load application unit.

In a case where the output destination device 80 includes the training device 80B, in the second example of the control method of the output destination device 80, the training device setting information includes information associating the operation of the at least one operating member 54 with at least one of activation of the training device 80B, deactivation of the training device 80B, and changing of load setting. In this case, in a case where the at least one operating member 54 is operated, the electronic controller 74 generates an output signal including the training device setting information, which is associated with the operation of the at least one operating member 54. The communication unit 76 transmits the generated output signal to the output destination device 80. The electronic controller 84 of the training device 80B executes the control corresponding to the output signal received by the communication unit 86.

For example, in a case where the training device setting information included in the received output signal includes activation of the training device 80B, the electronic controller 84 activates the training device 80B. For example, in a case where the training device setting information included in the received output signal includes deactivation of the training device 80B, the electronic controller 84 deactivates the training device 80B. For example, in a case where the training device setting information included the received output signal includes changing of the load setting, the electronic controller 84 controls the load application unit.

In a case where the output destination device 80 includes the audio device 80C, the setting information includes audio device setting information corresponding to the audio device 80C. Preferably, in a case where the output destination device 80 includes the audio device 80C, the interface unit 88 includes a speaker.

In a case where the output destination device 80 includes the audio device 80C, in the first example of the control method of the output destination device 80, the audio device setting information includes identification information of the audio device 80C. In this case, in a case where the at least one operating member 54 is operated, the electronic controller 74 generates an output signal including identification information of the audio device 80C, which is included in the audio device setting information, and the operation information related to the operated operating member 54. The communication unit 76 transmits the generated output signal to the audio device 80C. The electronic controller 84 of the audio device 80C executes the control corresponding to the output signal received by the communication unit 86. For example, in a state in which volume can be changed, in a case where the at least one operating member 54 is operated, the electronic controller 84 changes the volume. For example, in a case where the first operating member 54A is operated, the electronic controller 84 increases the volume. Further, in a case where the second operating member 54B is operated, the electronic controller 84 decreases the volume.

In a case where the output destination device 80 includes the audio device 80C, in the second example of the control method of the output destination device 80, the audio device setting information includes information associating the operation of the at least one operating member 54 with at least one of activation of the audio device 80C, deactivation of the audio device 80C, replaying music, stopping music, fast-forward music, rewinding music, changing volume, changing effect, and changing an equalizer. In this case, in a case where the at least one operating member 54 is operated, the electronic controller 74 generates an output signal including the audio device setting information, which is associated with the operation of the at least one operating member 54. The communication unit 76 transmits the generated output signal to the output destination device 80. The electronic controller 84 of the audio device 80C executes the control corresponding to the output signal received by the communication unit 86.

For example, the audio device setting information included in the received output signal includes activation of the audio device 80C, the electronic controller 84 activates the audio device 80C. For example, the audio device setting information included in the received output signal includes deactivation of the audio device 80C, the electronic controller 84 deactivates the audio device 80C. For example, the audio device setting information included the received output signal includes replaying music, the electronic controller 84 starts replaying music. For example, in a case where the audio device setting information included in the received output signal includes stopping music, the electronic controller 84 stops the music that is being replayed. For example, in a case where the audio device setting information included in the received output signal includes fast-forwarding music, the electronic controller 84 fast-forwards the music that is being replayed or selected. For example, in a case where the audio device setting information included in the received output signal includes rewinding music, the electronic controller 84 rewinds the music that is being replayed or selected. For example, in a case where the audio device setting information included the received output signal includes changing volume, the electronic controller 84 changes the volume. For example, in a case where the audio device setting information included the received output signal includes changing effect, the electronic controller 84 changes the effect. For example, in a case where the audio device setting information included the received output signal includes changing an equalizer, the electronic controller 84 changes the equalizer.

In a case where the output destination device 80 includes the video device 80D, the setting information includes video device setting information corresponding to the video device 80D. Preferably, in a case where the output destination device 80 includes the video device 80D, the interface unit 88 includes a screen.

In a case where the output destination device 80 includes the video device 80D, in the first example of the control method of the output destination device 80, the video device setting information includes identification information of the video device 80D. In this case, in a case where the at least one operating member 54 is operated, the electronic controller 74 generates an output signal including the identification information of the video device 80D, which is included in the video device setting information, and the operation information related to the operated operating member 54. The communication unit 76 transmits the generated output signal to the output destination device 80. The electronic controller 84 of the video device 80D executes a control corresponding to the output signal received by the communication unit 86. For example, in a state in which information that can be selected by a user is shown on the screen of the interface unit 88, in a case where the at least one operating member 54 is operated, the electronic controller 84 changes the selected information. For example, in a case where the first operating member 54A is operated, the electronic controller 84 changes a displayed content on the screen of the interface unit 88 so that the next option is selected. Further, in a case where the second operating member 54B is operated, the electronic controller 84 changes a displayed content on the screen of the interface unit 88 so that the previous option is selected.

In a case where the output destination device 80 includes the video device 80D, in the second example of the control method of the output destination device 80, the video device setting information includes information associating the operation of the at least one operating member 54 with at least one of activation of the video device 80D, deactivation of the video device 80D, replaying a video, stopping a video, fast-forwarding a video, rewinding a video, and changing a video channel. In this case, in a case where the at least one operating member 54 is operated, the electronic controller 74 generates an output signal including the video device setting information, which is associated with the operation of the at least one operating member 54. The communication unit 76 transmits the generated output signal to the output destination device 80. The electronic controller 84 of the video device 80D executes a control corresponding to the output signal received by the communication unit 86.

For example, the video device setting information included in the received output signal includes activation of the video device 80D, the electronic controller 84 activates the video device 80D. For example, the video device setting information included in the received output signal includes deactivation of the video device 80D, the electronic controller 84 deactivates the video device 80D. For example, the video device setting information included the received output signal includes replaying a video, the electronic controller 84 starts replaying a video. For example, in a case where the video device setting information included in the received output signal includes stopping a video, the electronic controller 84 stops the video that is being replayed. For example, in a case where the video device setting information included in the received output signal includes fast-forwarding a video, the electronic controller 84 fast-forwards the video that is being replayed or selected. For example, in a case where the video device setting information included in the received output signal includes rewinding a video, the electronic controller 84 rewinds the video that is being replayed or selected. For example, in a case where the video device setting information included the received output signal includes changing a video channel, the electronic controller 84 changes the video channel. The video channel includes, for example, a television channel and a channel of a video providing service on the internet.

Preferably, the communication unit 76 receives changing information that changes the setting information, and the electronic controller 74 updates the setting information based on the changing information received by the communication unit 76. Preferably, the storage 72 includes a storage area in which the setting information is stored in advance. The communication unit 76 is configured to receive the changing information through at least one of wired communication and wireless communication. Specifically, the communication unit 76 receives the changing information from at least one of the output destination device 80, the internet, and an external device through at least one of wired communication and wireless communication. An external device includes, for example, at least one of a personal computer and a smartphone. The electronic controller 74 overwrites the setting information stored in the storage 72 with the changing information received by the communication unit 76. The storage 72 of the electronic device 70 can store the setting information in advance. Alternatively, the storage 72 of the electronic device 70 can store the changing information that is initially received by the communication unit 76 as the setting information.

The changing information can include information that changes the relationship of the operation of the at least one operating member 54 with the information included in an output signal. The changing information changes the control executed by the output destination device 80 with the operation of the at least one operating member 54.

Figure 6:
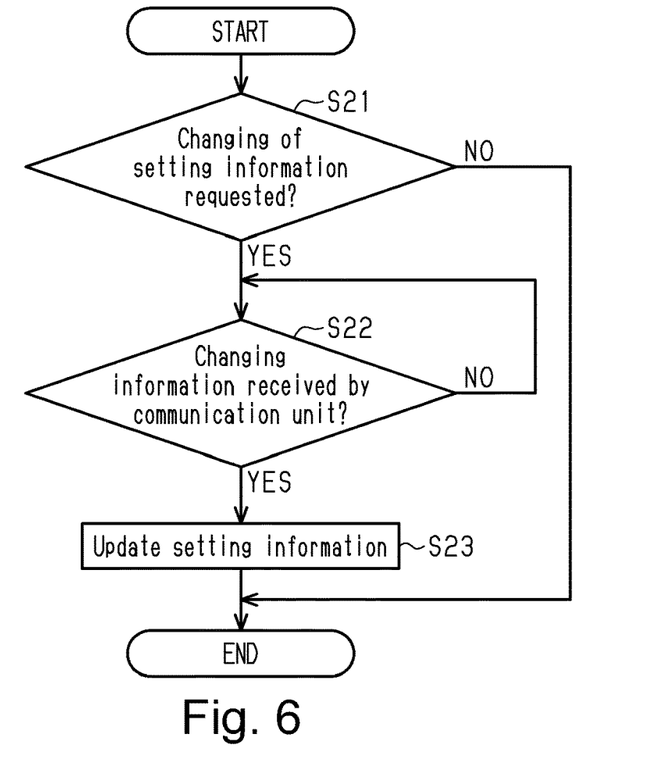
FIG. 6 is a flowchart illustrating a process executed by the electronic controller shown in FIG. 3 to update setting information.

A process executed by the electronic controller 74 of the electronic device 70 to change the setting information will now be described with reference to FIG. 6. In a case where electric power is supplied to the electronic controller 74, the electronic controller 74 starts the process from step S21 of the flowchart shown in FIG. 6. In a case where the process of the flowchart in FIG. 6 ends, the electronic controller 74 repeats the process from step S21 in predetermined cycles until the supply of electric power stops.

In step S21, the electronic controller 74 determines whether changing of the setting information has been requested. The request for changing the setting information is set, for example, by a user using the operating device 50 and an operation portion of another device that is connected to the electronic device 70 through wired or wireless communication. The other device includes, for example, at least one of a cycle computer, a personal computer, a smartphone, and the output destination device 80. In a case where changing of the setting information has not been requested, the electronic controller 74 ends the process. In a case where changing of the setting information has been requested, the electronic controller 74 proceeds to step S22.

In step S22, the electronic controller 74 determines whether the communication unit 76 has received the changing information. In a case where the communication unit 76 has not received the changing information, the electronic controller 74 repeats step S22. In a case where the communication unit 76 has received the changing information, the electronic controller 74 proceeds to step S23. In step S23, the electronic controller 74 updates the setting information with the changing information received in step S22. Then, the electronic controller 74 ends the process.

With the electronic device 70, the output destination device 80 can be operated using the operating device 50 mounted on the human-powered vehicle 10. This allows a user to operate the output destination device 80 with the operating device 50, which is used to drive the human-powered vehicle 10, in a state in which the user is riding the human-powered vehicle 10.

The electronic controller 74 can be configured to be switchable between a first mode and a second mode. In the first mode, the electronic controller 74 generates an output signal corresponding to the operation of the at least one operating member 54 and the output destination device 80 based on the setting information in accordance with the operation of the at least one operating member 54. In the second mode, the electronic controller 74 does not generate an output signal corresponding to the operation of the at least one operating member 54 and the output destination device 80 based on the setting information in accordance with the operation of the at least one operating member 54.

Figure 7:
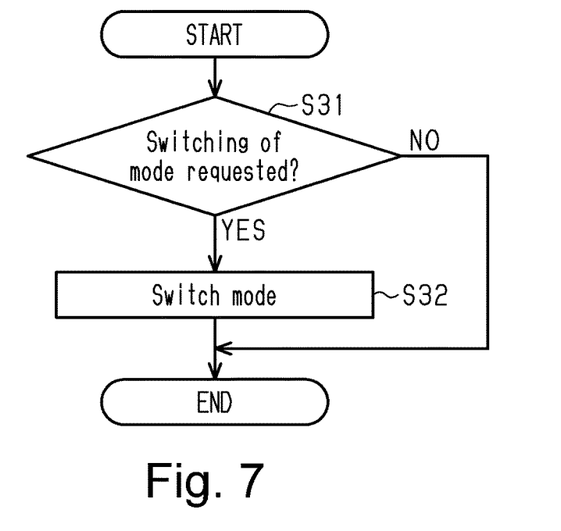
FIG. 7 is a flowchart illustrating a process executed by the electronic controller shown in FIG. 3 to switch between a first mode and a second mode.

A process executed by the electronic controller 74 of the electronic device 70 to switch between the first mode and the second mode will now be described with reference to FIG. 7. In a case where electric power is supplied to the electronic controller 74, the electronic controller 74 starts the process from step S31 of the flowchart shown in FIG. 7. In a case where the process of the flowchart in FIG. 7 ends, the electronic controller 74 repeats the process from step S31 in predetermined cycles until the supply of electric power stops.

In step S31, the electronic controller 74 determines whether switching of the mode has been requested. The request for switching the mode is set, for example, in a case where a predetermined operation is performed on the at least one operating member 54 of the operating device 50. The operating device 50 can further include an operation portion for switching the mode. In a case where switching of the mode has not been requested, the electronic controller 74 ends the process. In a case where switching of the mode has been requested, the electronic controller 74 proceeds to step S32.

In step S32, the electronic controller 74 switches the mode and then ends the process. In a case where step S32 is started in the first mode, the electronic controller 74 switches to the second mode. In a case where step S32 is started in the second mode, the electronic controller 74 switches to the first mode.

Figure 5:
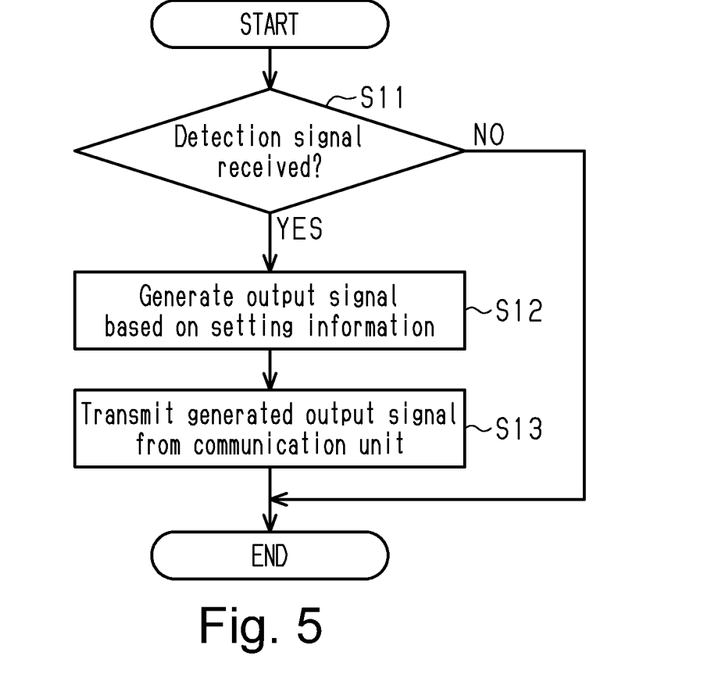
FIG. 5 is a flowchart illustrating a process executed by an electronic controller shown in FIG. 3 to transmit the output signal to the output destination device.

In a case where the electronic controller 74 is configured to be switchable between the first mode and the second mode and the electronic controller 74 is in the second mode, the process illustrated in FIG. 5 is not executed. In a case where the electronic controller 74 is configured to be switchable between the first mode and the second mode and the electronic controller 74 is in the first mode, the electronic controller 74 can be configured not to operate an operation subject component of the operating mechanism 52 even if the operating mechanism 52 includes the at least one operating member 54.

Modifications

The description related with the above embodiment exemplifies, without any intention to limit, an electronic device related to a human-powered vehicle operating device and a method for controlling an electronic device related to a human-powered vehicle operating device according to the present disclosure. In addition to the embodiment described above, the electronic device related to the human-powered vehicle operating device and the method for controlling the electronic device related to the human-powered vehicle operating device according to the present disclosure are applicable to, for example, modifications of the above embodiment that are described below and combinations of at least two of the modifications that do not contradict each other. In the modifications described hereafter, same reference numerals are given to those components that are the same as the corresponding components of the above embodiment. Such components will not be described in detail.

Figure 8:
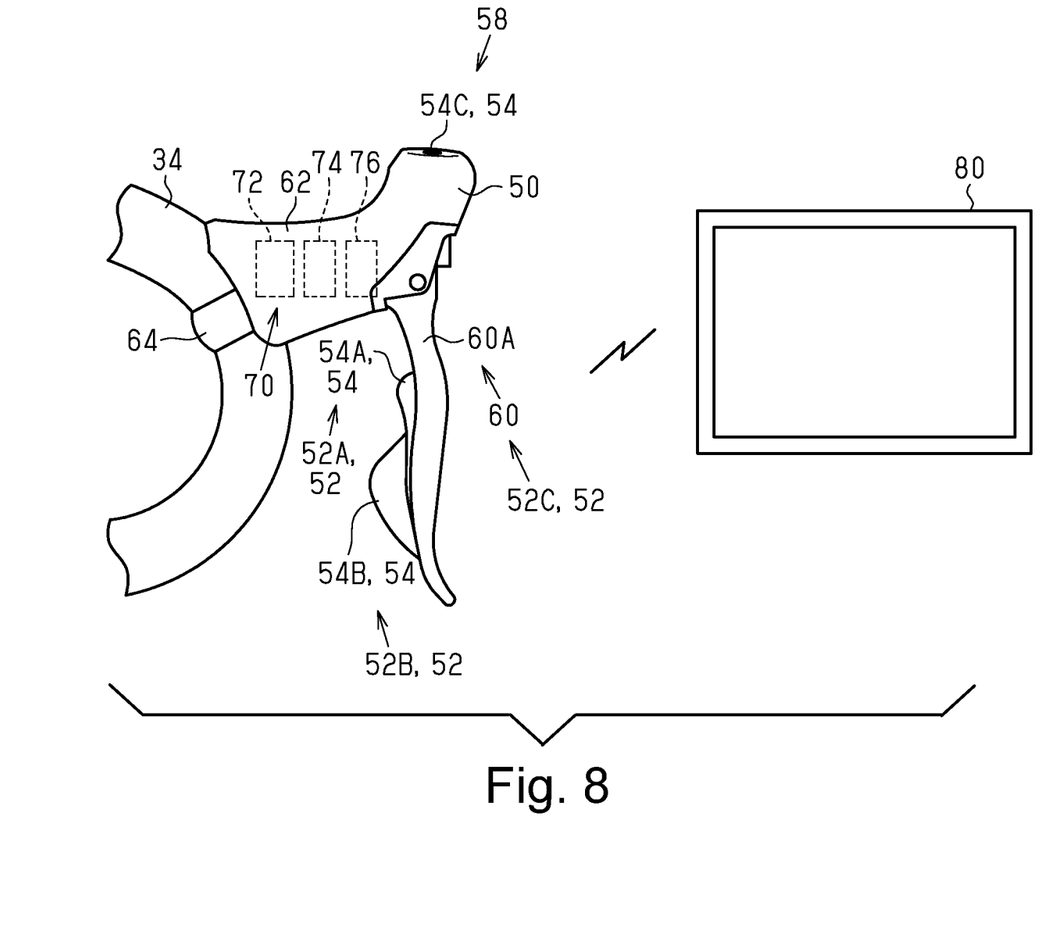
FIG. 8 is a schematic diagram of an operating device and an electronic device in accordance with one modification.

As shown in FIG. 8, the storage 72, the electronic controller 74, and the communication unit 76 can be provided on the housing 62 of the operating device 50. Preferably, in this case, the electronic controller 66 is omitted.

In the output destination device 80, the storage 82, the electronic controller 84, the communication unit 86, and the interface unit 88 can be provided on a single device. Alternatively, the storage 82, the electronic controller 84, the communication unit 86, and the interface unit 88 can be provided on separate devices.

In a case where the output destination device 80 includes the game device 80A and the training device 80B, the communication unit 86 can transmit an output signal via the communication unit 86 of the training device 80B to the communication unit 86 of the game device 80A.

The communication unit 76 of the electronic device 70 can transmit an output signal via another device to the output destination device 80. The other device is, for example, a cycle computer. In a case where the output destination device 80 includes the game device 80A and the training device 80B, the communication unit 86 of the training device 80B can transmit an output signal via a cycle computer to the communication unit 86 of the game device 80A.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. An electronic device related to a human-powered vehicle operating device that includes an operating mechanism, which is for operating at least one of a human-powered vehicle transmission device and a human-powered vehicle braking device, and at least one operating member, the electronic device comprising:
    a storage that stores setting information related to an operation of the at least one operating member and to an output destination device, the storage including a memory;
    an electronic controller configured to generate an output signal corresponding to the operation of the at least one operating member based on the setting information; and
    a communication unit that transmits the output signal to the output destination device that includes at least one of a game device, a training device, an audio device, and a video device, the communication unit including a transmitter,
    the electronic controller being configured to generate the output signal for selecting selectable information in a state in which information is selectable in response to operation of the at least one operating member, based on the setting information,
    the electronic controller being configured to generate the output signal related to controlling the human-powered vehicle in the output destination device in response to operation of the at least one operating member, based on the setting information.

2. The electronic device according to claim 1, wherein the setting information includes game device setting information corresponding to the game device.

3. The electronic device according to claim 2, wherein the game device setting information includes information associating the operation of the at least one operating member with at least one of activation of the game device, deactivation of the game device, changing traveling direction, changing traveling road, a cornering operation, obstacle avoidance, a transmission operation, changing rider posture, team chat initiation, team chat termination, a screen operation, changing display information, and changing travel environment.

4. The electronic device according to claim 1, wherein the setting information includes training device setting information corresponding to the training device.

5. The electronic device according to claim 4, wherein the training device setting information includes information associating the operation of the at least one operating member with at least one of activation of the training device, deactivation of the training device, and changing of a load setting.

6. The electronic device according to claim 1, wherein the setting information includes audio device setting information corresponding to the audio device.

7. The electronic device according to claim 6, wherein the audio device setting information includes information associating the operation of the at least one operating member with at least one of activation of the audio device, deactivation of the audio device, replaying music, stopping music, fast-forwarding music, rewinding music, changing volume, changing effect, and changing an equalizer.

8. The electronic device according to claim 1, wherein the setting information includes video device setting information corresponding to the video device.

9. The electronic device according to claim 8, wherein the video device setting information includes information associating the operation of the at least one operating member with at least one of activation of the video device, deactivation of the video device, replaying a video, stopping a video, fast-forwarding a video, rewinding a video, and changing a video channel.

10. The electronic device according to claim 1, wherein the communication unit is configured to receive changing information for changing the setting information, and the electronic controller is configured to update the setting information based on the changing information received by the communication unit.

11. The electronic device according to claim 10, wherein the communication unit is configured to receive the changing information through at least one of wired communication and wireless communication.

12. The electronic device according to claim 1, wherein the at least one operating member includes a plurality of operating members, and
the setting information includes information corresponding to operation of each of the operating members.

13. The electronic device according to claim 1, wherein the operation of the at least one operating member includes a plurality of operating procedures, and
the setting information includes information corresponding to each operating procedure of the at least one operating member.

14. The electronic device according to claim 1, wherein the electronic controller is configured to be switched between
a first mode that generates the output signal corresponding to the operation of the at least one operating member and the output destination device based on the setting information in accordance with the operation of the at least one operating member, and
a second mode that does not generate the output signal corresponding to the operation of the at least one operating member and the output destination device based on the setting information in accordance with the operation of the at least one operating member.

15. The electronic device according to claim 1, wherein the communication unit is configured to transmit the output signal to the output destination device through at least one of wired communication and wireless communication.

16. The electronic device according to claim 1, further comprising
a housing that houses the storage, the electronic controller, and the communication unit, the housing being located at a position separated from the human-powered vehicle operating device.

17. The electronic device according to claim 16, wherein the electronic device is configured to perform wired or wireless communication with the human-powered vehicle operating device.

18. The electronic device according to claim 1, wherein the storage, the electronic controller, and the communication unit are provided on a housing of the human-powered vehicle operating device.

19. A method for controlling an electronic device related to a human-powered vehicle operating device that includes an operating mechanism, which is for operating at least one of a human-powered vehicle transmission device and a human-powered vehicle braking device, and at least one operating member, the method comprising:
generating an output signal corresponding to an operation of the at least one operating member based on setting information related to the operation of the at least one operating member and to an output destination device, the output signal being generated for selecting selectable information in a state in which information is selectable in response to operation of the at least one operating member based on the setting information, and the output signal being generated related to controlling the human-powered vehicle in the output destination device in response to operation of the at least one operating member based on the setting information; and
transmitting the output signal to the output destination device that includes at least one of a game device, a training device, an audio device, and a video device.

* * * * *